US012791446B2

(12) United States Patent
Benarous et al.

(10) Patent No.: US 12,791,446 B2
(45) Date of Patent: Nov. 10, 2026

(54) ELECTRIC ACTUATOR HEALTH MONITORING

(71) Applicant: Goodrich Actuation Systems Limited, Solihull (GB)

(72) Inventors: Maamar Benarous, Coventry (GB); Paul Smith, Broseley (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 352 days.

(21) Appl. No.: 17/957,100

(22) Filed: Sep. 30, 2022

(65) Prior Publication Data

US 2023/0107181 A1 Apr. 6, 2023

(30) Foreign Application Priority Data

Oct. 5, 2021 (EP) .................................... 21275146

(51) Int. Cl.
*G01M 99/00* (2011.01)

(52) U.S. Cl.
CPC .................................. *G01M 99/00* (2013.01)

(58) Field of Classification Search
CPC ...... G01M 99/00; H02P 23/14; H02P 29/024; G05B 23/0235; G05B 23/0283; G05B 19/4065; G05B 2219/33315; G01R 31/343; G01R 31/008; G01R 31/2829; H02K 11/20
See application file for complete search history.

(56) References Cited

U.S. PATENT DOCUMENTS

| | | | | |
|---|---|---|---|---|
| 6,584,431 | B1 | 6/2003 | Thieriot et al. | |
| 6,917,203 | B1 | 7/2005 | Perotti et al. | |
| 7,283,934 | B2 * | 10/2007 | Deller | G05B 19/4063 702/183 |

(Continued)

FOREIGN PATENT DOCUMENTS

| | | | |
|---|---|---|---|
| CN | 107786033 | A | 3/2018 |

OTHER PUBLICATIONS

M. Mazzoleni, F. Previdi, M. Scandella and G. Pispola, “Experimental Development of a Health Monitoring Method for Electro-Mechanical Actuators of Flight Control Primary Surfaces in More Electric Aircrafts,” in IEEE Access, vol. 7, pp. 153618-153634, 2019, doi: 10.1109/ACCESS.2019.2948781. (Year: 2019).*

(Continued)

*Primary Examiner* — Huy Q Phan
*Assistant Examiner* — Martin Walter Braunlich
(74) *Attorney, Agent, or Firm* — Kilpatrick Townsend & Stockton LLP

(57) ABSTRACT

A method for monitoring the health of an electromechanical actuator “EMA” includes: generating a reference profile curve that is representative of a required demand of a measurable characteristic of the EMA; defining upper and lower tolerance limits of said reference profile curve; measuring said characteristic of said EMA and generating a measured curve profile based on said measurement; determining if the generated measured profile curve lies within the upper and lower tolerance limits of said reference profile curve; and if said generated measured profile curve does not lie within the upper and lower tolerance limits, providing an indication that said EMA is unhealthy.

8 Claims, 3 Drawing Sheets

(56) References Cited

U.S. PATENT DOCUMENTS

| | | | | |
|---|---|---|---|---|
| 7,449,858 | B2 * | 11/2008 | Chang ................ | G01R 31/2829 318/636 |
| 7,877,231 | B2 * | 1/2011 | Bharadwaj ......... | G05B 19/4065 702/182 |
| 8,504,307 | B2 * | 8/2013 | Norihisa ............ | G05B 19/4065 702/41 |
| 9,640,311 | B1 * | 5/2017 | Kordik .................. | B60T 8/1703 |
| 10,152,050 | B2 | 12/2018 | Peck et al. | |
| 10,907,722 | B2 | 2/2021 | Besser et al. | |
| 2012/0101777 | A1 | 4/2012 | Busch et al. | |
| 2015/0217748 | A1 | 8/2015 | Chico et al. | |
| 2019/0325663 | A1 | 10/2019 | Brim | |
| 2020/0086845 | A1 | 3/2020 | Benarous | |
| 2020/0091841 | A1 * | 3/2020 | Benarous ............ | H02P 29/0241 |

OTHER PUBLICATIONS

M. D. L. Dalla Vedova, P. C. Berri and S. Re, “Metaheuristic Bio-Inspired Algorithms for Prognostics: Application to on-Board Electromechanical Actuators,” 2018 3rd International Conference on System Reliability and Safety (ICSRS), Barcelona, Spain, 2018, pp. 273-279, doi: 10.1109/ICSRS.2018.8688832. (Year: 2018).*

Abstract for CN107786033 (A), Published: Mar. 9, 2018, 1 page.

Di, Rito, et al. “Model-Based Health-Monitoring of an Electro-Mechanical Actuator for Unmanned Aerial System Flight Controls”, 2017 IEEE International Workshop on Metrology for aerospace (Metroaerospace), IEEE, Jun. 21, 2017, pp. 502-511.

European Search Report for Application No. 21275146.5, mailed Mar. 16, 2022, 19 pages.

* cited by examiner

Healthy System

Unhealthy System - case I

Unhealthy System - case II

ELECTRIC ACTUATOR HEALTH MONITORING

CROSS-REFERENCE TO RELATED APPLICATIONS

This application claims priority to European Patent Application No. 21275146.5 filed Oct. 5, 2021, the entire contents of which is incorporated herein by reference.

TECHNICAL FIELD

This application relates to the monitoring of the health of an electric actuator.

BACKGROUND

Electric motors and drives are used for driving actuators in aircraft. Unfortunately, however, unexpected faults and a lack of safety can hinder the massive potential use of electromechanical actuators (EMAS) that are used in flight control actuators. There is therefore a need for improved systems and methods for the monitoring of faults in aircraft actuators.

SUMMARY

A method for monitoring the health of an electromechanical actuator is described herein. The method comprises the steps of generating a reference profile curve that is representative of a required demand of a measurable characteristic of the EMA that is being monitored for a known load and environmental condition. The method further comprises the steps of defining upper and lower tolerance limits of the reference profile curve and measuring those actual characteristics of the EMA and generating a second curve which is a measured curve profile based on those measurements. The method further comprises the steps of comparing the curve profiles and determining if the generated measured profile curve lies within the upper and lower tolerance limits of the reference profile curve. If the generated measured profile curve does not lie within the upper and lower limits then the method comprises the step of indicating that the EMA requires attention.

In some examples, the EMA may still be considered to be healthy, but may require attention, as its capability is reduced and may continue to reduce over time.

In some examples, when the EMA requires attention, it may be necessary to replace the EMA or have the EMA serviced.

In some examples, the step of indicating that the EMA needs attention may comprise providing a flag warning to a maintenance computer.

In some examples if the generated measured profile curve does lie within the upper and lower tolerance limits, the method repeats.

In some examples, the measurable characteristic and measured characteristic may comprise one or more of speed versus time, current versus time, voltage versus time or speed versus position.

In some examples, the method may comprise the step of storing said reference profile curve in a memory of a computer.

In some examples, the method may comprise defining a frequency and/or test conditions at which future health tests are to be performed.

In some examples, the method may be performed by a computer.

A system for monitoring the health of an electromechanical actuator is also described herein, said system being configured to perform any of the method steps discussed herein.

Figure 1:
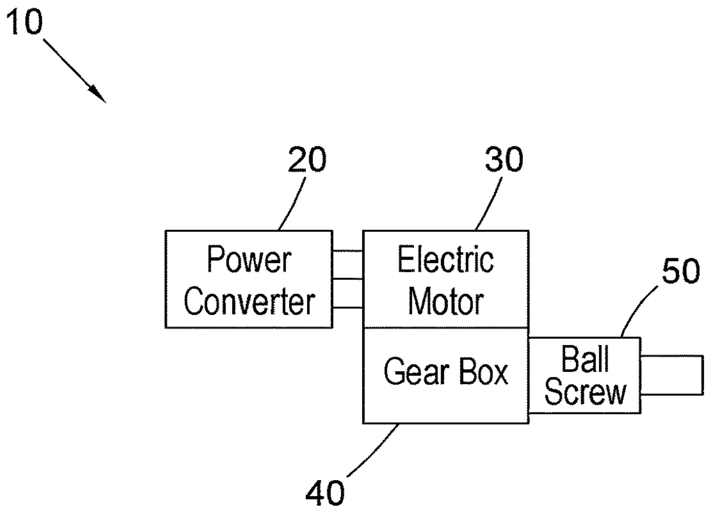
FIG. 1 is a schematic of the basis components of an EMA.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Described herein are examples of new systems and methods that are configured to utilize data that is currently already available in an aircraft, to control the electric motor in such a way that it is able to assess the health of the electromechanical actuator (EMA) without the need for any additional sensors.

FIG. 1 shows a schematic of the basic components of an EMA 10 such as those referred to herein. The EMA 10 comprises a power convertor 20 which is connected to an electric motor 30: In some example, a gear box 40 is powered by the motor and the gear box 40 then drives a screw 50. In some examples, this may be a ball screw, however, other types of screws, such as roller screw, acme screw, for example, may alternatively be used, as is known in the art. Other configurations of EMAs are known in the art, e.g. such as those which do not have gear boxes, and FIG. 1 provides an example of one of many different types of EMAs.

When in use, the electric motor 30 of the EMA 10 is started up, and the motor needs to accelerate in order to reach the required speed. This can be seen in FIG. 2, wherein speed is shown versus time for a healthy EMA 10. As can be seen in this figure, the motor accelerates initially until it reaches a speed of 8000 revolutions per minute (rpm). Once the speed demand is reached, the speed is maintained, as also shown in FIG. 2, until eventually, when the EMA 10 is being deactivated, the speed decelerates back to 0.

Figure 2:
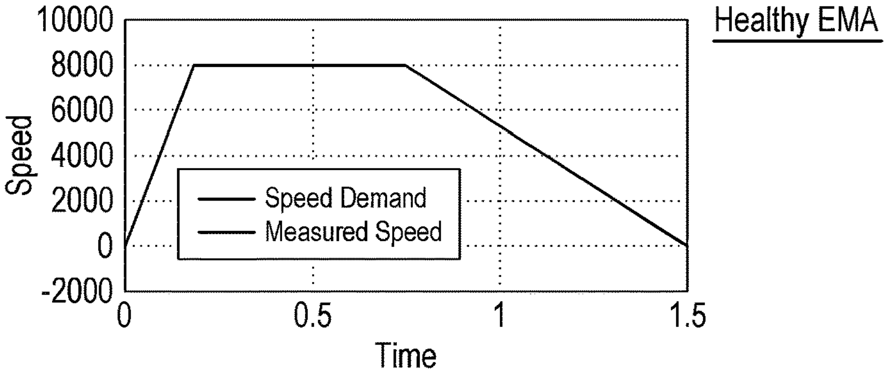
FIG. 2 depicts a graph showing speed with respect to time for a healthy EMA.

As can be seen in FIG. 2, for a healthy EMA the measured speed of the motor matches the speed demand of the EMA. For an unhealthy EMA, or at least an EMA that needs attention, however, the measured speed cannot meet the speed demand of the motor, resulting in a discrepancy as shown in the graph of FIG. 3.

Figure 3:
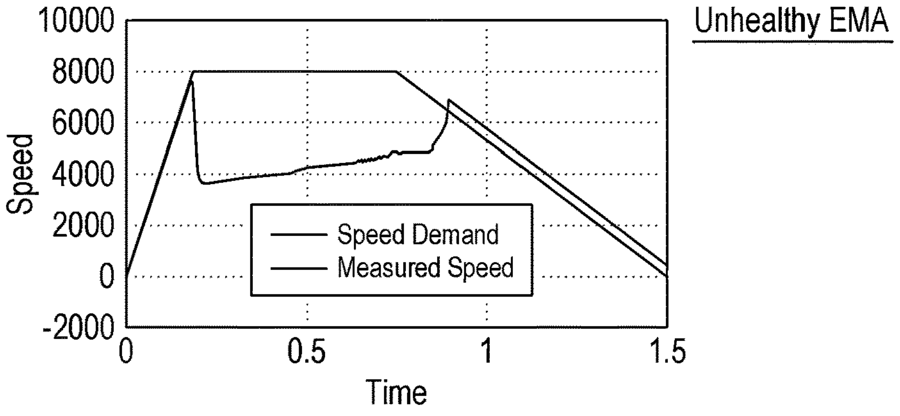
FIG. 3 depicts a graph showing speed with respect to time for an unhealthy EMA.

An unhealthy EMA, or at least an EMA that needs attention, such as that depicted in FIG. 3 may result due to there being an increased drag within the EMA, perhaps due to a bearing failure, screw inefficiency, or gear box efficiency etc. Other causes not listed here may also result in increased drag within the EMA.

An unhealthy EMA, or at least an EMA that needs attention, may therefore be defined as being an EMA which is experiencing a certain level of drag. Such drag may mechanical drag or magnetic drag. As can be seen from FIGS. 2 and 3, in that case, the measured speed does not correspond with the speed demand of the motor, or at least does not correspond within certain tolerance ranges.

By providing a method and system that is configured to compare the measured speed of the motor with a speed demand curve of the motor, it is therefore possible to determine whether or not the EMA is healthy or unhealthy (and experiencing drag), or if it at least requires attention before it becomes unhealthy. In this example, the new system and method therefore uses an existing motor speed sensor to determine whether or not an EMA is healthy or not.

In another example, the method or system may use an existing current sensor to determine whether an EMA is healthy or not.

Figure 4:
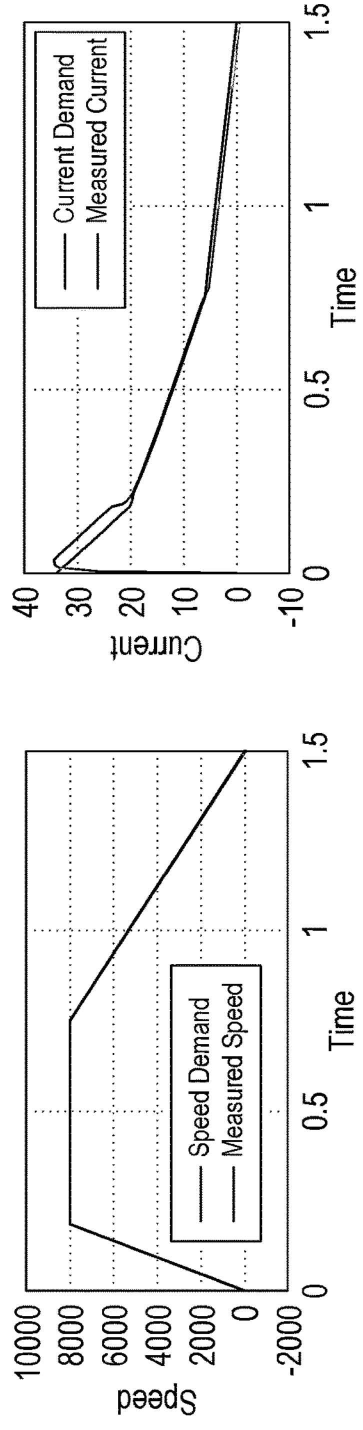
FIG. 4 depicts a graph showing speed with respect to time for a healthy EMA.

FIG. 4 depicts a healthy EMA. As can be seen from the graph showing speed versus time, the measured speed matches the speed demand. As can be seen from the adjacent graph, the measured current also matches the current demand.

In a situation wherein the mode of operation is under degradation, however, for example, due to added friction load, the current measurements against the demand will be compromised. This may be due to there being a reduction in the supply voltage, an increase of unbalanced forces due to a bearing failure, or a short circuit of the motor windings.

Figure 5:
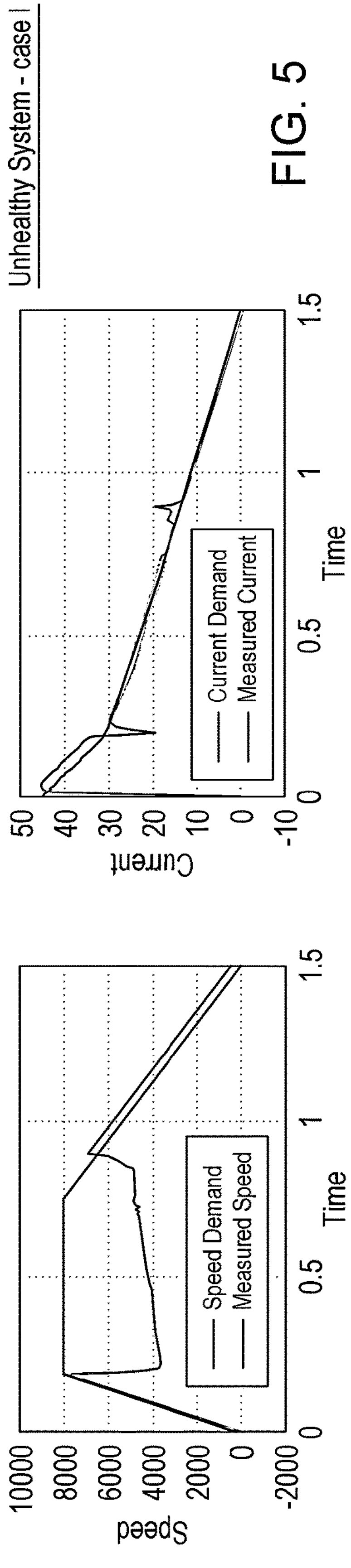
FIG. 5 depicts a first graph showing speed with respect to time for an unhealthy EMA.
Figure 6:
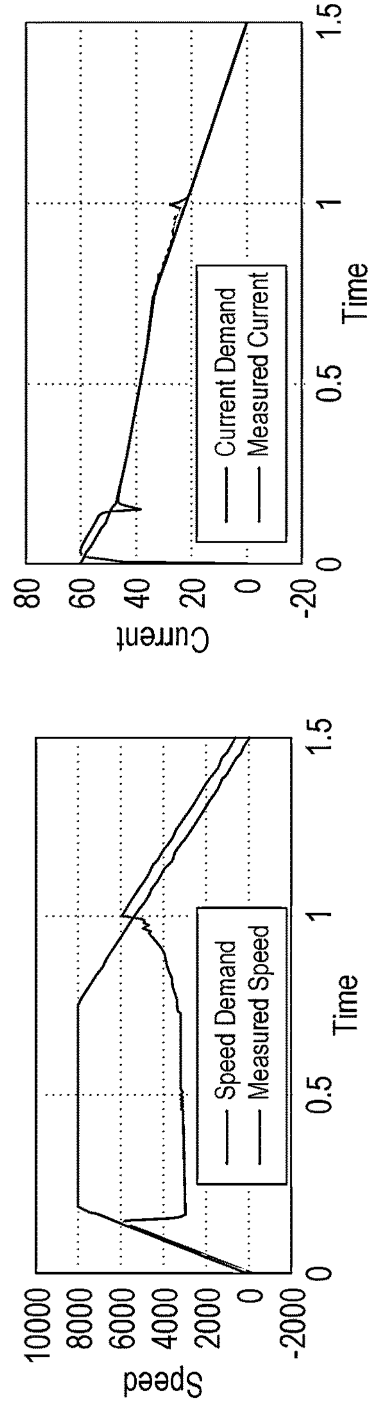
FIG. 6 depicts a second graph showing speed with respect to time for an unhealthy EMA.

This is shown in FIGS. 5 and 6 wherein the measurements of two EMAs that are experiencing added friction load are depicted. Both of these EMAs are experiencing drag and are therefore classed as unhealthy EMAs or at least EMAs that need attention. It can be seen from both the first and second graph of each figure that there is a discrepancy between the measured demand of both the speed and the current and the speed or current demand. A comparison of a measured current and a measured speed can therefore also provide evidence of an EMA that is experiencing drag.

In an alternative embodiment, the sensor that is being used to monitor the health of the EMA may comprise a voltage sensor. When the EMA experiences drag, the measured voltage readings will differ from a voltage demand curve, thereby indicating an unhealthy EMA, or at least an EMA that needs attention.

Other sensors that are already provided in an EMA may alternatively be used.

Although each of these sensors can be used individually to determine whether or not an EMA is healthy, the combination of the results of these sensors can also be used, to more accurately and efficiently identify an unhealthy EMA, or an EMA that needs attention.

For a given EMA the drive current limit is set to overcome this demand under the worst conditions. For example, the worst conditions may be considered to be when the temperature is cold and so drag may be at its highest, thereby meaning that there is a most demanding load condition. In contrast, in an ideal condition, the measured motor speed will align with the demand.

Figure 7:
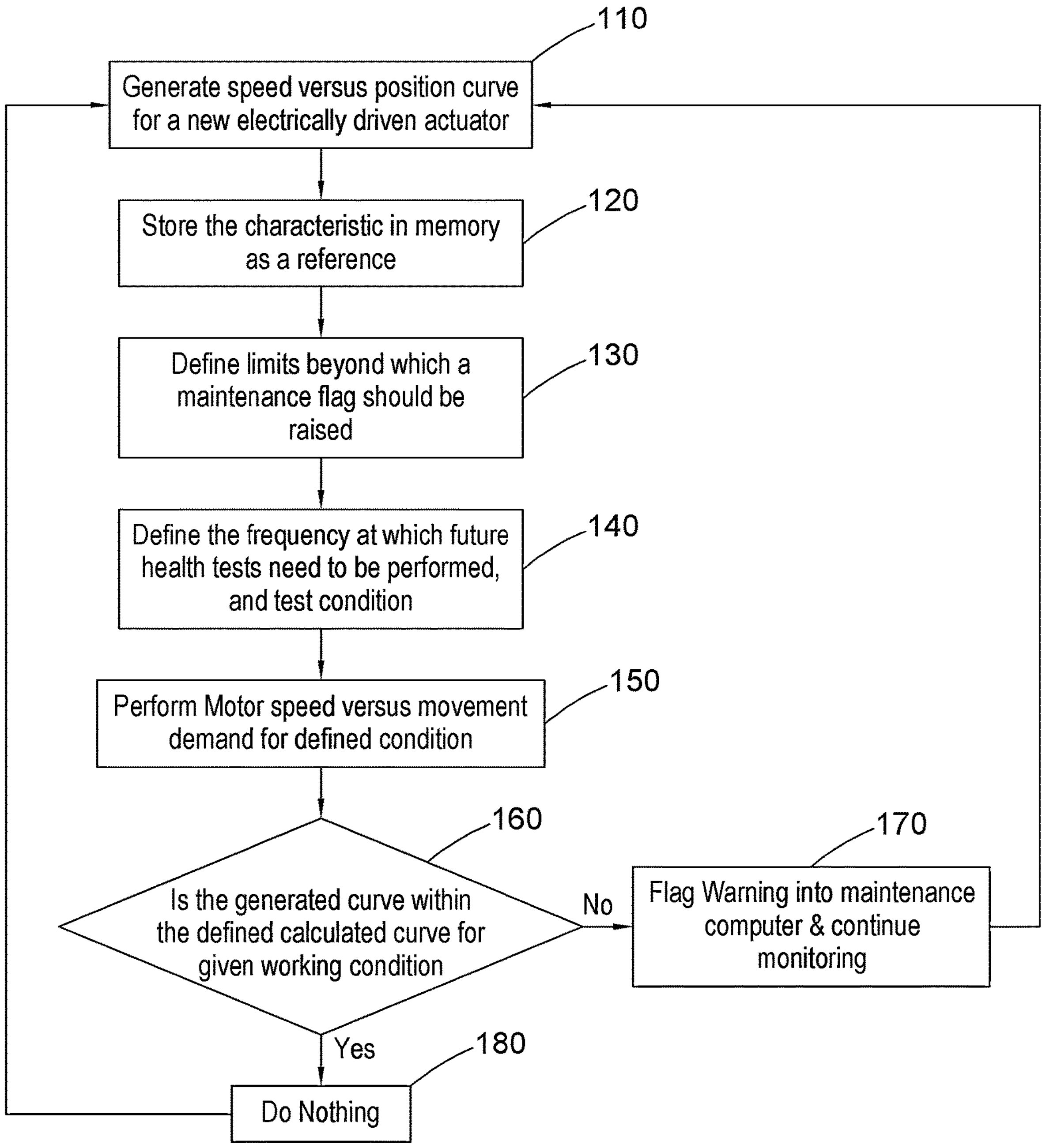
FIG. 7 depicts a new method for determining the health of an EMA, using existing sensors that are normally found on an EMA.

A new method for determining the health of an EMA using existing sensors that are normally found on an EMA is shown in FIG. 7. This example is described in relation to the use of a speed and position sensor. Normally, for an EMA, the position versus time is measured. By measuring both position versus time as well as speed versus time, it is possible to construct from these two curves the curve indicating speed versus position. The method could also, however, be performed in the same way using a current sensor, or voltage sensor, as described above.

The new systems and methods described herein comprise using a reference demand speed versus position profile to investigate the health of the system. In order to do this, the system may be configured to perform the method 100 steps of generating 110 a speed versus position curve for a new electrically driven actuator. This speed versus position curve is later used as the reference curve for monitoring and determining the health of the EMA. The method may further comprise storing 120 the reference curve in a memory as a reference. The method may further comprise 130 defining limits the curve beyond which a maintenance flag should be raised. That is, the curve should have defined upper and lower tolerance limits. The method may further comprise 140 defining the frequency at which future health tests need to be performed, as well as the test conditions. That is, the method may define a mean, frequency and condition to measure the system speed demand taking into account load conditions etc. that would impact the curve in reality. The maximum and minimum tolerances that are acceptable should be taken into account. The method may further comprise 150 measuring the actual motor speed versus movement demand for a defined condition. The method may further comprise 160 determining if the generated curve is within the defined calculated reference curve for a given working condition. If the answer is no, the method performs the step 170 of providing a flag warning into a maintenance computer and continuing monitoring. If the answer is yes, then the method may comprise the step 180 of doing nothing. The method may then repeat from 110 onwards again.

The examples described herein allow for an increase in health monitoring of EMAs that may provide advanced notice of oncoming faults and which reduce Aircraft on Ground (AOG) and dispatch interruption. By improving the detection capability of a potentially failing component prior to it failing then it is possible to reduce AOG as the customer can plan replacement hardware in advance of the component failing. The examples are also able to utilize existing system hardware without the requirement for additional sensing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for monitoring a health of an electromechanical actuator (EMA) comprising a power converter connected to an electric motor, the electric motor connected to a gear box which drives a screw, the method comprising:

generating a reference profile curve of speed versus position that is representative of a required speed demand of the electric motor of the EMA for a known load and environmental condition, defining upper and lower tolerance limits of said reference profile curve, wherein the upper and lower tolerance limits are associated with a measurable speed versus position of the EMA for monitoring the health of the EMA;

providing, by the power converter, power to the EMA according to one or more test conditions for monitoring the health of the EMA;

measuring, by a speed sensor and a position sensor of said EMA, an actual motor speed versus movement demand of the EMA, said speed versus position of said EMA and generating a measured curve profile based on said measurement, wherein said speed versus position is derived from measuring both position versus time and speed versus time of said EMA;

determining whether the generated measured profile curve lies within the upper and lower tolerance limits of said reference profile curve for a given working condition; and in response to determining said generated measured profile curve does not lie within the upper and lower tolerance limits, providing a flag warning into a maintenance computer indicating that said EMA needs attention.

2. The method of claim 1, wherein said method of providing an indication that the EMA needs attention comprises providing a flag warning into a maintenance computer.

3. The method of claim 1, wherein if said generated measured profile curve does lie within the upper and lower tolerance limits, repeating said method.

4. The method of claim 1, further comprising:

generating a second reference profile curve that is representative of a required demand of the EMA;

defining upper and lower tolerance limits of said second reference profile curve, wherein the upper and lower tolerance limits of said second reference profile curve are associated with a measurable characteristic of the EMA for monitoring the health of the EMA, wherein said characteristic comprises one or more of speed versus time, current versus time, or voltage versus time; and in response to determining said generated second measured profile curve does not lie within the upper and lower tolerance limits of said second reference profile curve, providing the indication that said EMA needs attention.

5. The method of claim 1, further comprising:

storing said reference profile curve in a memory of a computer.

6. The method of claim 1, further comprising:

defining a frequency and/or the test conditions for monitoring the EMA, wherein the frequency and/or the test conditions are at which future health tests are to be performed.

7. The method of claim 1, wherein said method is performed by a computer.

8. A system for monitoring the health of an electromechanical actuator (EMA), said system being configured to perform the method of claim 1.

* * * * *